United States Patent [19]

Bae et al.

[11] Patent Number: 5,797,211
[45] Date of Patent: *Aug. 25, 1998

[54] POSITION-SENSING LIGHT AND ALARM FOR A FISHING ROD

[76] Inventors: Tae Hong Bae; Sang Yun Bae; Sang Il Bae, all of 6898 Old Annapolis Rd., Linthicum, Md. 21090

[ * ] Notice: This patent issued on a continued prosecution application filed under 37 CFR 1.53(d), and is subject to the twenty year patent term provisions of 35 U.S.C. 154(a)(2).

[21] Appl. No.: 623,533

[22] Filed: Mar. 29, 1996

Related U.S. Application Data

[63] Continuation-in-part of Ser. No. 496,198, Jun. 28, 1995, Pat. No. 5,555,667.

[51] Int. Cl.$^6$ ............................................. A01K 97/12
[52] U.S. Cl. ....................................... 43/17; 43/17.5
[58] Field of Search ........................................ 43/17, 17.5

[56] References Cited

U.S. PATENT DOCUMENTS

| | | | |
|---|---|---|---|
| 3,882,629 | 5/1975 | Kaye | 43/17 |
| 3,918,191 | 11/1975 | Williamson | 43/17 |
| 4,246,716 | 1/1981 | Elmer | 43/17 |
| 4,266,217 | 5/1981 | Kao et al. | 43/17 |
| 4,399,633 | 8/1983 | Haughey et al. | 47/57.6 |
| 4,458,437 | 7/1984 | Ou | 43/17 |
| 4,458,438 | 7/1984 | McCulley | 43/17 |
| 4,479,321 | 10/1984 | Welstead | 43/17 |
| 4,590,701 | 5/1986 | Rivers | 43/17 |
| 4,766,688 | 8/1988 | Hiles | 43/17 |
| 5,083,249 | 1/1992 | Chen | 362/171 |
| 5,125,181 | 6/1992 | Brinton | 43/17.5 |
| 5,274,943 | 1/1994 | Ratcliffe et al. | 43/17 |
| 5,299,107 | 3/1994 | Ratcliffe et al. | 362/158 |
| 5,555,667 | 9/1996 | Bae et al. | 43/17 |

*Primary Examiner*—Michael J. Carone
*Assistant Examiner*—James S. Bergin
*Attorney, Agent, or Firm*—Birch, Stewart, Kolasch & Birch, LLP

[57] ABSTRACT

A position-sensing light and alarm system includes an attachment for movably mounting to the fishing rod; a housing fixedly connected to the attachment, the housing including a light source for illuminating light, a sound source for generating an alarm sound, and a battery for supplying power to the system; a first switch for selectively controlling the system; a second switch for selectively controlling the light source; a mercury switch attached to the housing and being rotatable with respect to the housing to achieve a first position, the mercury switch achieving a second position upon a movement of the fishing rod; and a control circuit disposed in the housing, whereby at least one of the light source and the sound source is activated in response to the mercury switch being at the second position.

16 Claims, 1 Drawing Sheet

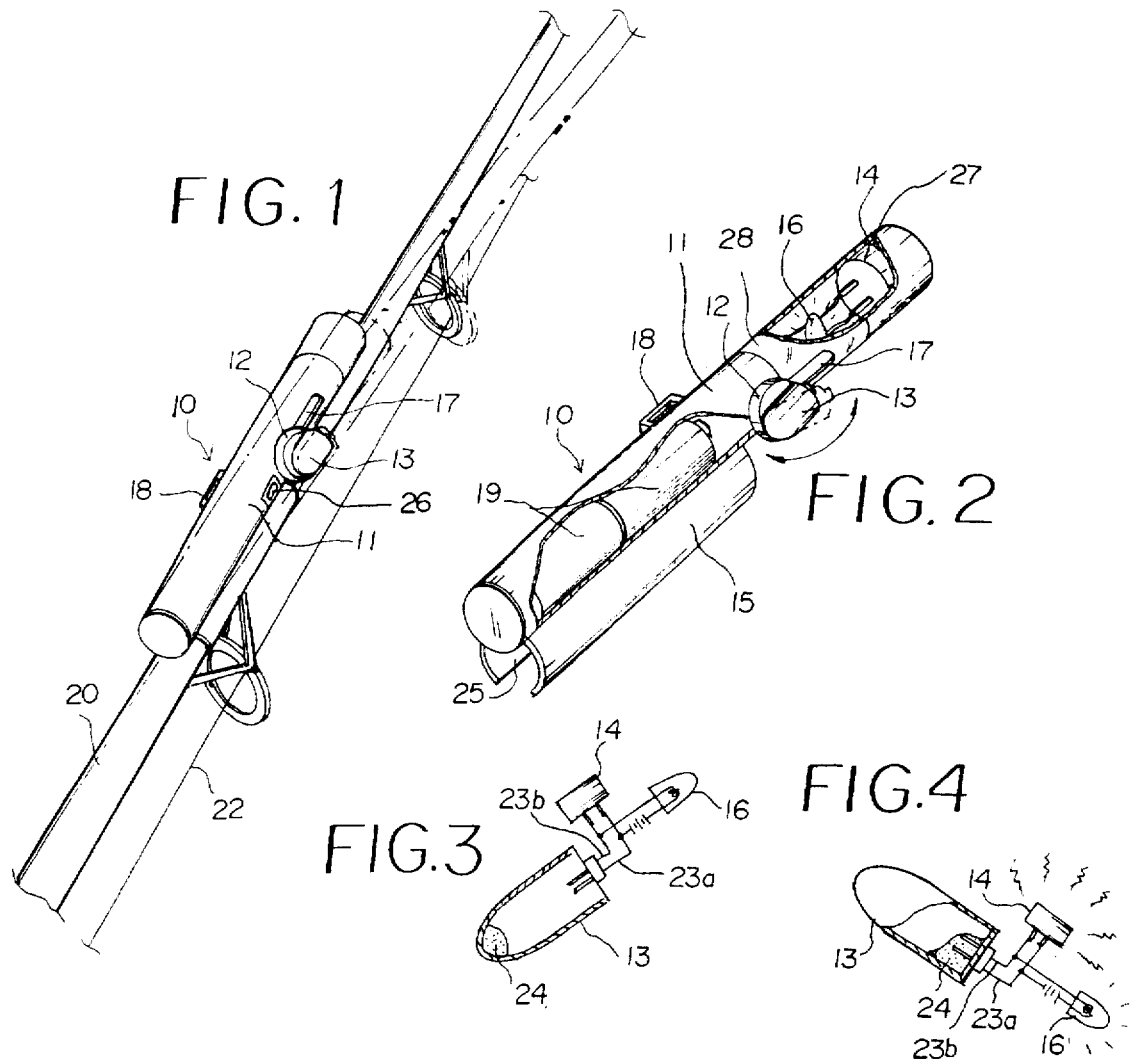
FIG. 1
FIG. 2
FIG. 3
FIG. 4
FIG. 5
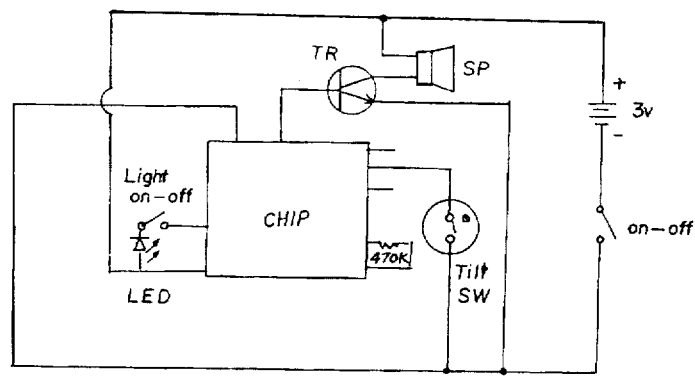

5,797,211

1

POSITION-SENSING LIGHT AND ALARM FOR A FISHING ROD

CROSS-REFERENCE TO RELATED APPLICATION

This is a continuation-in-part application of U.S. patent application Ser. No. 08/496,198, filed on Jun. 28, 1995, which issued as U.S. Pat. No. 5,555,667.

BACKGROUND OF THE INVENTION

1. Field of the Invention

The present invention relates to a position-sensing light and alarm system for a fishing rod and, more particularly, to an improved fishing light and alarm system adjustably and detachably mountable onto a portion of a fishing rod for alerting the fisherman by illuminating light and/or generating an alarm sound when fish are attempting to take the bait.

2. Description of Related Art

Various types of signaling devices for night fishing are known in the art. Generally, many fish feed primarily between sunset and sunrise. Most of the time, it is difficult or impossible to see the end of the fishing rod when fishing at night. Therefore, devices have been previously proposed for lighting a lamp in response to a fish biting the bait on the fishing line. However, such conventional signaling devices have been bulky and complex in construction and have a large housing size, thereby causing interference with normal fishing techniques.

Some of the conventional fishing light devices are difficult to attach to a fishing rod, and are not sensitive to indicate a strike on the line. Furthermore, such conventional devices are complicated in structure. Such devices are shown in U.S. Pat. Nos. 3,882,629 to Kaye and 4,479,321 to Welstead.

SUMMARY OF THE INVENTION

Accordingly, it is an object of the present invention to provide a position-sensing light and alarm system for attachably mounting on a fishing rod, which eliminates the above problems encountered with the conventionally lighted fishing rod.

Another object of the present invention is to provide a position-sensing light and alarm system including an attachment for movably mounting to the fishing rod; a housing fixedly connected to the attachment, the housing including a light source for illuminating light, a sound source for generating an alarm sound, and a battery for supplying power to the system; a first switch for selectively controlling the system; a second switch for selectively controlling the light source; a mercury switch attached to the housing and being rotatable with respect to the housing to achieve a first position, the mercury switch achieving a second position upon a movement of the fishing rod; and a control circuit disposed in the housing, whereby at least one of the light source and the sound source is activated in response to the mercury switch being at the second position.

A further object of the present invention is to provide a position-sensing light and alarm system which does not interfere with normal fishing techniques and does not contact either the fishing reel or the fishing line.

Still another object of the present invention is to provide a positioning sensing light and alarm system for attachably mounting to a fishing rod, which is simple in structure, inexpensive to manufacture, durable in use, and refined in appearance.

2

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view showing a position-sensing light and alarm system on a fishing rod according to a preferred embodiment of the present invention;

FIG. 2 is an exploded and cut-away view of the position-sensing light and alarm system according to the preferred embodiment of the present invention;

FIG. 3 is a view showing an off-position of a mercury switch used in the position-sensing light and alarm system according to the preferred embodiment of the present invention;

FIG. 4 is a view showing an on-position of the mercury switch according to the preferred embodiment of the present invention; and FIG. 5 is a schematic diagram of a circuitry used in the position-sensing light and alarm system of the present invention.

DETAILED DESCRIPTION OF THE PREFERRED EMBODIMENTS

Referring now in detail to the drawings for the purpose of illustrating preferred embodiments of the present invention, the position-sensing light and alarm system 10 is exemplarily shown in FIGS. 1 and 2.

As shown in FIGS. 1 and 2, the system 10 includes a housing 11 and an attachment 15 for easily and adjustably attaching the housing 11 to a fishing rod 20. The housing 11 has a cylindrical configuration and is fixedly connected with the attachment 15. The attachment 15 has a gradually tapering cylindrical configuration with an opening 25 for slidably attaching to and removing from the outer portion of the fishing rod 20.

The system 10 further includes a system switch 18 and a light switch 26 both disposed on the housing 11, a sound opening 17 through which an alarm sound can be heard, a connector 12, and a rotatable mercury switch 13 operatively connected with the housing 11 through the connector 12.

The housing 11 contains a light source or an LED 16 for illuminating light through a transparent section 28 of the housing, a speaker 14 for generating an alarm sound through the sound opening 17, a chip 27 for controlling the system, and batteries 19 for supplying power to the system.

Referring to FIGS. 3 and 4, the mercury switch 13 mounted on the housing 11 operates to activate the LED 16 and/or the speaker 14, depending on the position of the fishing rod 20. As shown in FIG. 3, when the mercury switch 13 is at the OFF position, neither the speaker 14 nor the LED 16 is activated. However, when the mercury switch is rotated to the ON position as shown in FIG. 4, mercury bubbles 24 disposed within the mercury switch 13 contact both first and second contacts 23a and 23b. As a result, an alarm sound and light are generated simultaneously from the speaker 14 and the LED 16, respectively. The LED can be selected to illuminate red, green, blue, or any other color.

The position-sensing light and alarm system 10 for fishing rods according to the preferred embodiment of the present invention operates as follows.

A fisherman operates the fishing rod in many different positions. For example, the fishing rod can be placed against a stand or the fisherman can hold the fishing rod when waiting for the fish to bite the bait on the fishing line 22. Therefore, once the position-sensing light and alarm system 10 is slidably attached to the fishing rod through the attachment 15, it is necessary to rotatably adjust the position of the mercury switch with respect to the position of the fishing rod to detect the movement of the fishing rod.

By rotatably adjusting the mercury switch to be at the OFF position prior to the moving of the fishing rod, any movement of the fishing rod rising due a fish biting the bait or for some other reason, will activate the mercury switch. For example, if the fisherman were to hold the fishing rod substantially parallel to the ground, the mercury switch 13 can be rotated so that it is at the OFF position as shown in FIG. 3. When the fish is attempting to bite the bait and as a result the fishing rod 20 is moved downwardly, the mercury switch is moved to the ON position as shown in FIG. 4. Consequently, the alarm sounds and light are generated to alert the fisherman both visually and audibly in an effective manner.

The system switch 18 controls the activation of the entire system. When the system switch 18 is at its ON position, both the alarm and light are generated if the mercury switch 13 is activated. However, when it is unnecessary or ineffective to have the light mechanism in operation, for example, during daytime fishing, the present system is provided with a light switch 26 for selectively turning ON and OFF the LED 16. In this case, only the speaker will be activated to alert the user.

FIG. 5 shows a schematic diagram of a circuitry used in the position-sensing light and alarm system in accordance with the embodiments of the present invention. As shown in FIG. 5, the chip 27 (e.g. integrated circuit) disposed in one end portion of the housing is connected to the speaker 14, the LED 16, the mercury switch 13, the system switch 18 and the light switch 26. The chip 27 controls operation of the speaker 14 and the LED 16. The batteries 19 supply 3 volts, for example, to the system.

As described hereinabove, the system effectively alerts the fisherman when the fish are attempting to bite the bait by illuminating light and/or generating an alarm sound. The system provides a housing and an attachment through which the housing can be easily attached to or detached from the fishing rod, and is equipped with a system switch and a light switch for selectively operating the light and alarm system according to the fisherman's preference or for convenience.

Furthermore, because the system provides a rotatable mercury switch which can be easily adjusted to adapt to the position of the fishing rod, the fisherman can freely operate the fishing rod in many different positions and at the same time fully enjoy the benefits of the system.

Moreover, the system according to the present invention is effective as a security system against any intruders because movement of the fishing rod can activate the alarm, the light mechanism or both.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position-sensing light and alarm system for a fishing rod, the system comprising:

an attachment for movably mounting to the fishing rod;

a housing fixedly connected to the attachment, the housing including a light source for illuminating light, a sound source for generating an alarm sound, and a battery for supplying power to the system;

a first switch for selectively controlling the system;

a second switch for selectively controlling the light source;

a mercury switch with mercury bubbles, mounted on an outer surface of the housing so that the mercury bubbles are located outside of the housing, the mercury switch being manually rotatable with respect to the housing to vary a sensitivity of the mercury switch and achieving a first position initially and a second position upon a movement of the fishing rod; and a control circuit disposed in the housing;

whereby at least one of the light source and the sound source is activated in response to the mercury switch being at the second position.

2. The position-sensing light and alarm system of claim 1, wherein the housing includes:

an opening disposed near the sound source for transmitting the alarm sound from the sound source, and a transparent section including the opening for transmitting the light illuminated from the light source.

3. The position-sensing light and alarm system of claim 2, wherein the housing has a cylindrical configuration and the attachment has a cylindrically tapering configuration and an elongated tapering groove for slidably receiving or slidably removing from the fishing rod.

4. The position-sensing light and alarm system of claim 3, wherein the control circuit includes:

a chip mounted near one end portion of the housing for controlling the light source and the sound source, and connection means for electrically connecting the chip with the mercury switch, the light source, the sound source, the battery, the first switch, and the second switch.

5. The position-sensing light and alarm system of claim 1, wherein the mercury switch contains therein the mercury bubbles, and includes first and second contacts for connecting with the light source and the sound source.

6. The position-sensing light and alarm system of claim 1, wherein the light source includes an LED, the sound source includes a speaker, and the battery supplies approximately 3 volts.

7. The position-sensing light and alarm system of claim 2, wherein when the first switch is on and the mercury switch is at the second position, the light and alarm sound are generated by the light source and the sound source, respectively.

8. The position-sensing light and alarm system of claim 7, wherein when the first switch is on, the second switch is off, and the mercury switch is at the second position, the alarm sound is generated.

9. The position-sensing light and alarm system of claim 1, wherein the mercury switch is manually rotated in a clockwise or counterclockwise direction to achieve the first position.

10. The position-sensing light and alarm system of claim 9, wherein the first position of the mercury switch is an OFF position and the second position of the mercury switch is an ON position.

11. A method of sensing position of a fishing rod in a position-sensing light and alarm system, the method comprising the steps of:

providing a housing having a light source for illuminating light, a sound source for generating an alarm sound, a power source, and a control circuit therein, and mounting a mercury switch with mercury bubbles, a light switch and a system switch on an outer surface of the housing, so that the mercury bubbles are located outside of the housing;

slidably mounting the housing on the fishing rod;

turning on the system switch to activate the system;

manually rotating the mercury switch with respect to the housing to vary a sensitivity thereof, the mercury switch achieving a first position initially and a second position upon a movement of the fishing rod; and generating the light and alarm sound by the light source and the sound source, respectively, when the mercury switch is at the second position.

12. A method of claim 11, further comprising the step of:

turning off the light switch to turn off the light source completely.

13. A method of claim 12, wherein said manually rotating step includes the step of:

manually rotating the mercury switch in a clockwise or counterclockwise direction, the first position of the mercury switch turning off the mercury switch and the second position of the mercury switch turning on the mercury switch.

14. A method of claim 13, further comprising the steps of:

providing the housing with a transparent section for illuminating the light from the light source therethrough;

providing the housing with an opening in the transparent section for transmitting the alarm sound from the sound source therethrough; and providing the housing with an attachment having a cylindrically tapering configuration and an elongated tapering groove for slidably mounting or detaching the housing to or from the fishing rod.

15. A method of claim 14, wherein the light source includes an LED, the sound source includes a speaker, and the power source supplies approximately 3 volts.

16. A method of claim 14, wherein the control circuit includes:

a chip mounted near one end portion of the housing for controlling, the light source and the sound source, and connection means for electrically connecting the chip with the mercury switch, the light source, the sound source, the power source, the system switch, and the light switch.

* * * * *